United States Patent
Bischinger

(10) Patent No.: US 11,057,828 B2
(45) Date of Patent: Jul. 6, 2021

(54) METHOD FOR ESTABLISHING A COMMUNICATION CONNECTION OF A COMMUNICATION TERMINAL VIA A COMMUNICATION NETWORK

(71) Applicant: DEUTSCHE TELEKOM AG, Bonn (DE)

(72) Inventor: Kurt Bischinger, Vienna (AT)

(73) Assignee: DEUTSCHE TELEKOM AG, Bonn (DE)

( * ) Notice: Subject to any disclaimer, the term of this patent is extended or adjusted under 35 U.S.C. 154(b) by 315 days.

(21) Appl. No.: 16/066,309

(22) PCT Filed: Dec. 23, 2016

(86) PCT No.: PCT/EP2016/082641
§ 371 (c)(1),
(2) Date: Jun. 27, 2018

(87) PCT Pub. No.: WO2017/114798
PCT Pub. Date: Jul. 6, 2017

(65) Prior Publication Data
US 2020/0314924 A1    Oct. 1, 2020

(30) Foreign Application Priority Data

Dec. 30, 2015   (DE) .................. 10 2015 122 980.3
Dec. 30, 2015   (EP) ................................ 15203162

(51) Int. Cl.
*H04W 72/04*    (2009.01)
*H04W 48/18*    (2009.01)
(Continued)

(52) U.S. Cl.
CPC ......... *H04W 48/18* (2013.01); *H04W 12/069* (2021.01); *H04W 76/11* (2018.02)

(58) Field of Classification Search
CPC .................................................. H04W 76/10
See application file for complete search history.

(56) References Cited

U.S. PATENT DOCUMENTS

| 2004/0067735 A1 | 4/2004 | Lobley |
| 2005/0276229 A1 | 12/2005 | Torabi |

(Continued)

FOREIGN PATENT DOCUMENTS

| CN | 101431780 A | 5/2009 |
| CN | 101631354 A | 1/2010 |

(Continued)

OTHER PUBLICATIONS

"3rd Generation Partnership Project; Technical Specification Group Services and System Aspects; Feasibility Study on New Services and Markets Technology Enablers; Stage 1 (Release 14)", 3GPP Draft; TR22 891-V120-RM, 3rd Generation Partnership Project (§GPP), Mobile Competence Centre; 650, Route Des Lucioles; F-06921 Sophia-Antipolis Cedex; France, Dec. 9, 2015 (Dec. 9, 2015), XP051071179, p. 16.

(Continued)

*Primary Examiner* — Hassan Kizou
*Assistant Examiner* — Mahbubul Bar Chowdhury
(74) *Attorney, Agent, or Firm* — Leydig, Voit & Mayer, Ltd.

(57) ABSTRACT

A method for establishing a communication connection of a communication terminal via a communication network includes receiving an identification of the communication terminal by a first identification entity of a first subnetwork, wherein the identification of the communication terminal identifies the communication terminal. The method further includes identifying the communication terminal by the first identification entity on a basis of the identification of the communication terminal, assigning a subnetwork to the (Continued)

communication terminal by a management entity on a basis of an assignment of a subnetwork identifier to the communication terminal, and establishing a communication connection via the first subnetwork if the subnetwork identifier assigned to the identification of the communication terminal corresponds to the first subnetwork or establishing a communication connection of the communication terminal via the second subnetwork if the subnetwork identifier assigned to the identification and the subnetwork identifier of the first subnetwork are different.

12 Claims, 5 Drawing Sheets

(51) Int. Cl.
*H04W 76/11* (2018.01)
*H04W 12/069* (2021.01)

(56) References Cited

U.S. PATENT DOCUMENTS

| | | | |
|---|---|---|---|
| 2006/0274744 | A1 | 12/2006 | Nagai et al. |
| 2013/0007232 | A1 | 1/2013 | Wang et al. |
| 2013/0294410 | A1 | 11/2013 | Huang et al. |
| 2016/0353367 | A1* | 12/2016 | Vrzic ............... H04W 72/0433 |
| 2016/0353465 | A1* | 12/2016 | Vrzic ............... H04W 28/0247 |
| 2017/0070892 | A1* | 3/2017 | Song ............... H04L 41/042 |
| 2017/0086049 | A1* | 3/2017 | Vrzic ............... H04W 12/001 |
| 2017/0086118 | A1* | 3/2017 | Vrzic ............... H04W 36/26 |
| 2017/0142591 | A1* | 5/2017 | Vrzic ............... H04L 47/2408 |
| 2017/0164212 | A1* | 6/2017 | Opsenica ........... H04W 24/02 |
| 2017/0188283 | A1 | 6/2017 | Akiyoshi |
| 2018/0310238 | A1* | 10/2018 | Opsenica ........... H04W 12/06 |
| 2018/0352501 | A1* | 12/2018 | Zhang ............... H04W 48/14 |

FOREIGN PATENT DOCUMENTS

| | | |
|---|---|---|
| CN | 105813195 A | 7/2016 |
| EP | 3398379 A1 | 11/2018 |
| JP | 2006345088 A | 12/2006 |
| WO | WO 2015178032 A1 | 4/2017 |
| WO | WO 2017114798 A1 | 7/2017 |

OTHER PUBLICATIONS

Deutsche Telekom: "Key issue: 3GPP architecture impacts to support network slicing roaming", 3GPP Draft; S2-153934_Network_Slicing_Roaming, 3$^{rd}$ Generation Partnership Project (3GPP), Mobile Competence Centre; 650, Route Des Lucioles; F-06921 Sophia-Antipolis Cedex; France, Bd. SA WG2, Nr. Anaheim, USA; Nov. 16, 2015-Nov. 20, 2015, Nov. 16, 2015 (Nov. 16, 2015), XP051041140.

3GPP TSG-RAN3#89, "Dedicated Core Network (DÉCOR) overview and RAN3 specification impact", R3-151607, Aug. 24-28, 2015, pp. 1-6.

* cited by examiner

METHOD FOR ESTABLISHING A COMMUNICATION CONNECTION OF A COMMUNICATION TERMINAL VIA A COMMUNICATION NETWORK

CROSS REFERENCE TO RELATED APPLICATIONS

This application is a U.S. National Stage Application under 35 U.S.C. § 371 of International Application No. PCT/EP2016/082641 filed on Dec. 23, 2016, and claims benefit to German Patent Application No. DE 10 2015 122 980.3 filed on Dec. 30, 2015, and European Patent Application No. EP 15203162.1 filed on Dec. 30, 2015. The International Application was published in German on Jul. 6, 2017 as WO 2017/114798 A1 under PCT Article 21(2).

FIELD

The present invention relates to communication establishment in a communication network having a plurality of subnetworks, in particular in a 5G communication network having a plurality of slices.

BACKGROUND

The fifth generation of mobile technology (5G) relates to the requirements and technical challenges of the future communication networks from approximately 2020 and beyond. A completely mobile and networked society characterized by an enormous growth in data traffic and mutual networking on a plurality of levels is addressed thereby.

New radio interfaces are required in 5G in order to meet the requirements imposed on the use of higher frequencies, for example for new applications such as the Internet of Things (IoT), special capabilities, for example a shorter propagation time, which go beyond that which 4G communication networks are capable of achieving. In this case, 5G is considered to be an end-to-end system which comprises all network aspects with a design which enables a high degree of convergence. 5G will make full use of the current access mechanisms and their possible further developments, including the current fixed network access technologies of many other access technologies yet to be developed.

5G will operate in a highly heterogeneous environment, that is to say with a plurality of types of access technologies, multi-layer networks, various types of communication devices and user interactions etc. A wide variety of applications with diametrical requirements are intended to be optimally supported, for example failsafe robust communication, communication with low data rates or broadband communication in densely populated areas. In such an environment, there is a fundamental demand for 5G in order to accomplish a seamless and consistent user experience over time and space. For the operator of a 5G communication network, it is necessary to adapt the resources used to the respective requirements in an optimum and dynamic manner in order to be able to simultaneously support the multiplicity of applications.

Therefore, in 5G, there is a need, on the one hand, to increase the communication performance, in particular to provide a higher data throughput, a shorter delay, particularly high reliability, a far higher connection density and a larger mobility area, but, on the other hand, to also increase the flexibility during operation and to provide tailor-made functions with the lowest possible use of means. This increased performance is expected together with the capability to control highly heterogeneous environments and the capability to safeguard the confidentiality, identity and privacy of the users.

SUMMARY

In an embodiment, the present invention provides a method for establishing a communication connection of a communication terminal via a communication network, wherein the communication network has a plurality of subnetworks including a first subnetwork and a second subnetwork, wherein a first identification entity is arranged in the first subnetwork and a second identification entity is arranged in the second subnetwork for the purpose of identifying the communication device, wherein a subnetwork identifier is assigned to each of the first subnetwork and the second subnetwork, and wherein a management entity is arranged in the communication network and is configured to manage an assignment of the communication terminal to one of the two subnetworks. The method includes receiving an identification of the communication terminal by the first identification entity of the first subnetwork, wherein the identification of the communication terminal identifies the communication terminal; identifying the communication terminal by the first identification entity on a basis of the identification of the communication terminal; assigning a subnetwork to the communication terminal by the management entity on a basis of an assignment of a subnetwork identifier to the communication terminal; and establishing a communication connection of the communication terminal via the first subnetwork if the subnetwork identifier assigned to the identification of the communication terminal corresponds to the subnetwork identifier of the first subnetwork or establishing a communication connection of the communication terminal via the second subnetwork if the subnetwork identifier assigned to the transmitted identification and the subnetwork identifier of the first subnetwork are different.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide for increasing the communication performance and flexibility, in particular in 5G.

The methods and systems presented herein may be of various types. The individual elements described can be implemented by means of hardware or software components, for example electronic components which can be produced by means of various technologies and comprise, for example, semiconductor chips, ASICs, microprocessors, digital signal processors, integrated electrical circuits, electro-optical circuits and/or passive components.

The devices, systems and methods presented herein are suitable for transmitting information via a communication network. In this case, the term communication network denotes the technical infrastructure on which signals are transmitted. The communication network comprises substantially the switching network, in which the signals are transmitted and switched between the stationary devices and platforms of the mobile radio network or fixed network, and the access network, in which the signals are transmitted between a network access device and the communication terminal. In this case, the communication network may comprise both components of a mobile radio network and components of a fixed network. In the mobile radio network, the access network is also referred to as an air interface and comprises, for example, a base station (NodeB, eNodeB, radio cell) with a mobile radio antenna in order to establish communication to a communication terminal, for example a mobile telephone or a smartphone or a mobile device with a mobile radio adapter. In the fixed network, the access network comprises, for example, a DSLAM (digital subscriber line access multiplexer) in order to connect the communication terminals of a plurality of subscribers in a wired or cabled manner. Communication can be passed on to further networks, for example of other network operators, for example international networks, via the switching network.

Figure 1:
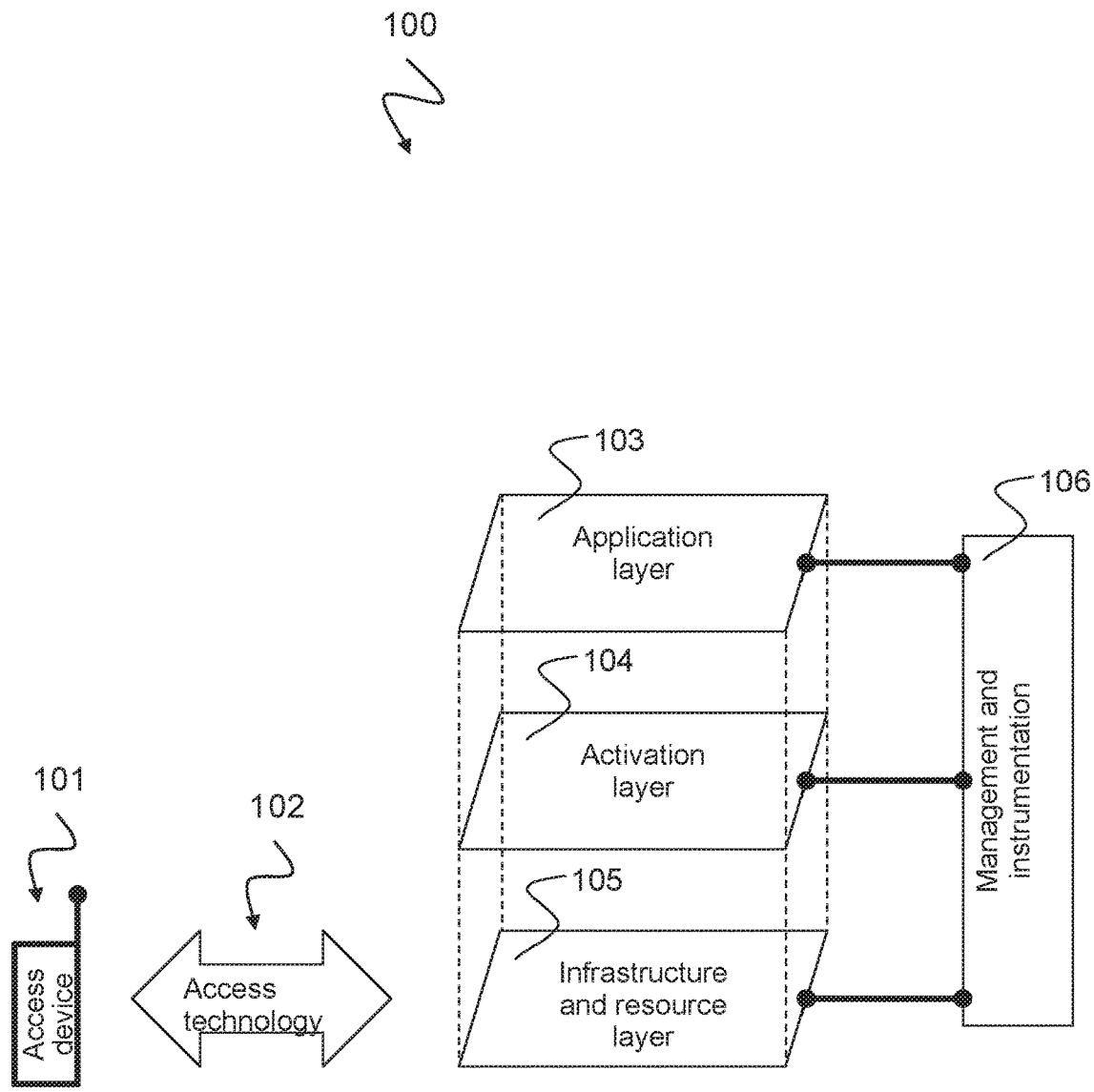
FIG. 1 shows a schematic illustration of a 5G system architecture 100.

The devices, systems and methods presented herein are intended to enhance communication in communication networks, in particular in communication networks according to the 5G system architecture are presented below. FIG. 1 shows a schematic illustration of such a 5G system architecture 100. The 5G system architecture 100 comprises an area having 5G communication terminals 101 which are connected, via various access technologies 102, to a multilayer communication structure comprising an infrastructure and resource layer 105, an activation layer 104 and an application layer 103 which are managed via a management and instrumentation level 106.

The infrastructure and resource layer 105 comprises the physical resources of a convergent network structure comprising fixed network and mobile radio network components ("fixed-mobile convergence") with access nodes, cloud nodes (comprising processing and storage nodes), 5G devices, for example mobile telephones, portable devices, CPE, machine communication modules and others, network nodes and associated links. 5G devices may comprise various and configurable capabilities and may act as a relay or a hub, for example, or may operate as a computer/storage resource depending on the respective context. These resources are made available to the higher layers 104, 103 and to the management and instrumentation level 106 via corresponding APIs (application programming interfaces). The process of monitoring the performance and the configurations is an inherent part of such APIs.

The activation layer 104 comprises a library of functions which are required inside a converged network in the form of modules of a modular architecture. These comprise functions which are implemented by means of software modules, which can be retrieved from a storage place of the desired location, and a set of configuration parameters for particular parts of the network, for example radio access. These functions and capabilities can be called on request by the management and instrumentation level 106 by using the APIs provided for this purpose. Numerous variants may exist for particular functions, for example various implementations of the same functionality which have a different performance or characteristic. The various degrees of performance and the capabilities offered can be used to distinguish the network functionalities to a considerably greater extent than is possible in current networks, for example to offer a nomadic mobility, a vehicle mobility or an air traffic mobility as a mobility function on the basis of the specific needs.

The application layer 103 comprises specific applications and services of the network operator, of the company, of the vertical operator or of third parties using the 5G network. The interface to the management and instrumentation level 106 allows, for example, particular, that is to say dedicated, network slices to be established for an application or allows an application to be allocated to an existing network slice.

The management and instrumentation level 106 is the contact point in order to convert the required use cases (also business models) into actual network functions and slices. It defines the network slices for a given application scenario, concatenates the modular network functions relevant thereto, assigns the relevant performance configurations and maps everything to the resources of the infrastructure and resource layer 105. The management and instrumentation level 106 also manages the scaling of the capacity of these functions and their geographical distribution. In particular use cases, it may also have capabilities which allow third parties to generate and manage their own network slices by using the APIs. On account of the numerous tasks of the management and instrumentation level 106, this is not a monolithic block of functionality but rather a collection of modular functions which integrate advances which have been achieved in various network domains, for example NFV ("network function virtualization"), SDN ("software-defined networking") or SON ("self-organizing networks"). The management and instrumentation level 106 uses data-aided intelligence to optimize all aspects of service arrangement and provision.

Figure 2:
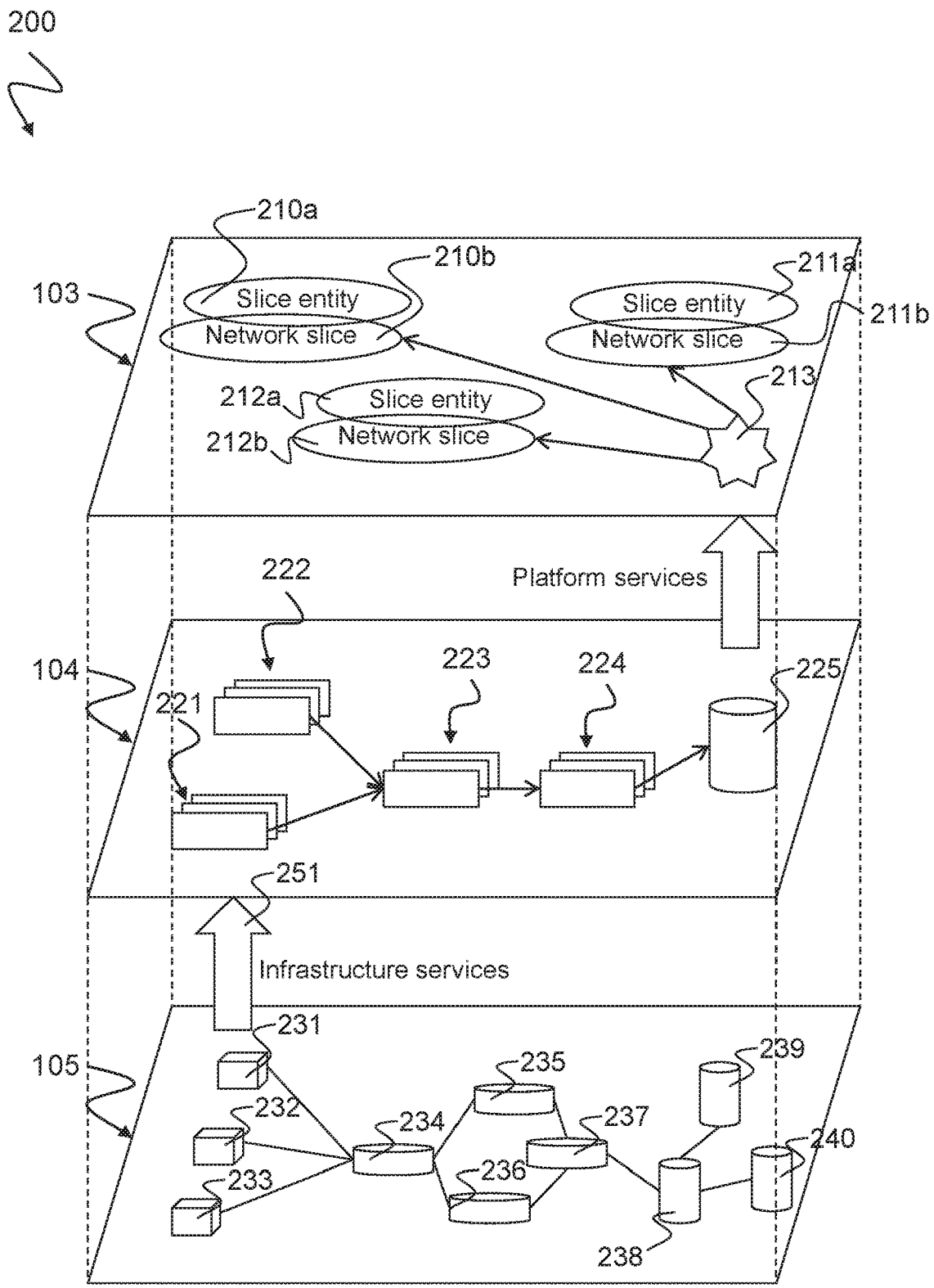
FIG. 2 shows a schematic illustration of a 5G communication network having a plurality of slices 200.

The devices, systems and methods presented herein are intended to improve communication in communication networks, in particular in 5G communication networks having a plurality of network slices, as described below. FIG. 2 shows a schematic illustration of a 5G communication network 200 having a plurality of network slices. The 5G communication network 200 comprises an infrastructure and resource layer 105, an activation layer 104 and an application layer 103.

The infrastructure and resource layer 105 comprises all physical assets assigned to a network operator, that is to say sites, cables, network nodes etc. This layer 105 forms the basis for all network slices. It is constructed as generically as possible without too many specialized physical units. The infrastructure and resource layer 105 conceals any type of user-specific implementation from the upper layers, with the result that the remaining systems can be used in the best possible manner for different slices. Components of the infrastructure and resource layer 105 are based on hardware and software or firmware which is required for the respective operation and is made available in this case as an infrastructure and resource layer 105 to the layers above as resource objects. For example, objects of the infrastructure and resource layer 105 comprise virtual machines, virtual links or connections and virtual networks, for example virtual access nodes 231, 232, 233, virtual network nodes 234, 235, 236, 237 and virtual computer nodes 238, 239, 240. As the term "virtual" already states, the infrastructure and resource layer 105 provides the objects in the form of an "infrastructure as a service" 251, that is to say in an abstracting, virtualized form, to the next higher layer 104.

The activation layer 104 is arranged above the infrastructure and resource layer 105. It uses the objects of the infrastructure and resource layer 105 and adds additional functionality thereto in the form of (for example non-physical) software objects/VNFs in order to make it possible to generate any type of network slices and thus to provide a platform as a service to the next higher layer 103.

Software objects can exist in any granularity and can comprise a tiny or a very large fragment of a network slice. In order to allow network slices to be generated on a suitable abstraction level, various abstracted objects 221 can be combined with other abstracted objects and with virtual network functions 222 in the activation layer 104 in order to form combined objects 223 which can be converted into aggregated objects 224 and are made available to the next higher level in an object library 225. The complexity can therefore be hidden behind the network slices. For example, a user can generate a mobile broadband slice and in the process can define only a KPI (Key Performance Indicator) without having to specify specific features such as individual local antenna coverage, backhaul connections and specific degrees of parameterization. In order to support an open environment and to allow network functions to be added or deleted on request, an important capability of the activation layer 104 is that it supports the dynamic rearrangement of functions and connectivities in a network slice, for example by using SFC ("Service Function Chaining") or modifying software, with the result that the functionality of a slice can be completely predefined and can comprise both approximately static software modules and software modules which can be dynamically added.

In this case, a network slice can be considered to be a software-defined entity which is based on a set of objects which define a complete network. The activation layer 104 plays a key role in the success of this concept since it can comprise all software objects which are needed to provide the network slices and the corresponding skills for handling the objects. The activation layer 104 can be considered to be a type of network operating systems complemented by a network generation environment. An important task of the activation layer 104 is to define the corresponding abstraction levels. Network operators therefore have sufficient freedom to design their network slices, while the platform operator can still maintain and optimize the physical nodes. For example, the performance of the daily tasks, such as the addition or replacement of NodeBs etc., is supported without the intervention of the network customers. The definition of suitable objects which model a complete telecommunication network is one of the important tasks of the activation layer 104 when developing the network slice environment.

A network slice, also referred to as a 5G slice, supports the communication services of a particular connection type with a particular way of handling the C (control) and U (user data) layer. A 5G slice is composed of a collection of different 5G network functions and specific radio access technology (RAT) settings which are together combined to use the specific use case. Therefore, a 5G slice can span all domains of the network, for example software modules which run on cloud nodes, specific configurations of the transport network which support a flexible location of the functions, a particular radio configuration or even a particular access technology as well as a configuration of the 5G devices. Not all slices contain the same functions; some functions which nowadays appear to be essential for a mobile network may not even occur in some slices. The intention of the 5G slice is to provide only the functions which are required for the specific use case and to avoid all other unnecessary functionalities. The flexibility behind the slice concept is the key both for expanding existing use cases and for generating new use cases. Third-party devices can therefore be granted permission to control particular aspects of the slicing via suitable APIs in order to thus be able to provide tailor-made services.

The application layer 103 comprises all generated network slices 210b, 211b, 212b and offers these as a "network as a service" to various network users, for example various customers. The concept allows the reuse of defined network slices 210b, 211b, 212b for various users, for example customers, for example as a new network slice entity 210a, 211a, 212a. That is to say, a network slice 210b, 211b, 212b which is assigned to an automotive application, for example, can also be used for applications of various other industrial applications. The slice entities 210a, 211a, 212a which have been generated by a first user can be independent of the slice entities which have been generated by a second user, for example, even though the entire network slice functionality may be the same.

According to embodiments, the invention provides methods for establishing a communication connection of a communication terminal via a communication network, wherein the communication network has a plurality of subnetworks having a first subnetwork and a second subnetwork, wherein a first identification entity is arranged in the first subnetwork and a second identification entity is arranged in the second subnetwork for the purpose of identifying the communication device, wherein a subnetwork identifier is assigned to each subnetwork of the communication network, wherein a management entity is arranged in the communication network and manages an assignment of the communication terminal to one of the two subnetworks, and wherein the method comprises the following steps: receiving an identification of the communication terminal by means of the first identification entity of the first subnetwork, wherein the identification identifies the communication terminal; identifying the communication terminal by means of the first identification entity on the basis of the identification of the communication terminal; assigning a subnetwork to the communication terminal by means of the management entity on the basis of an assignment of a subnetwork identifier to the communication terminal; and establishing a communication connection of the communication terminal via the first subnetwork if the subnetwork identifier assigned to the identification of the communication terminal corresponds to the subnetwork identifier of the first subnetwork; or establishing a communication connection of the communication terminal via the second subnetwork if the subnetwork identifier assigned to the transmitted identification and the subnetwork identifier of the first subnetwork are different.

The communication performance can be increased on account of the subnetwork structure of the communication network. In particular, a higher data throughput, a shorter delay, particularly high reliability, a far higher connection density and a larger mobility area can be obtained thereby. Together with an increased performance, highly heterogeneous environments can be controlled using the method along with the capability to safeguard the confidentiality, identity and privacy of the users.

According to one embodiment of the method, the communication connection is established via the second subnetwork if the subnetwork identifier assigned to the transmitted identification is the subnetwork identifier of the second subnetwork. This has the advantage that, in the case of a default setting of the first subnetwork in the communication terminal, communication is carried out via the first subnetwork, that is to say the communication terminal initially does not need any information relating to the subnetwork structure and the structure of the communication network. However, if information is available to the communication terminal, for example from previous communication, indicating that it is assigned to the second subnetwork, communication can be immediately initiated via the second subnetwork without the default query being required.

According to one embodiment of the method, the communication network is a network of a fifth generation (5G) or of a further generation, and the subnetworks are slices of the communication network. This makes it possible to achieve all advantages of the 5G network structure, for example higher radio frequencies with a higher data throughput, new applications, for example the Internet of Things, special capabilities, for example a shorter propagation time, which go beyond that which 4G communication networks are capable of achieving. The communication network may provide an end-to-end system which comprises all network aspects with a high degree of convergence. Furthermore, the existing access mechanisms and their possible further developments can be fully used.

According to one embodiment of the method, the management entity assigns the subnetwork identifier to the communication terminal on the basis of at least one of the following assignments: an assignment of the identification of the communication terminal, in particular a hardware identifier of the communication device such as an IMSI (International Mobile Subscriber Identity) or an IMEI (International Mobile Station Equipment Identity) or an eID (eUICC identifier) of the eUICC (embedded universal integrated circuit card), to the subnetwork identifier and/or an assignment of a communication service to the communication terminal and/or an assignment of a software application to the communication terminal and/or an assignment of an operating system of the communication terminal to one of the two subnetworks. This has the advantage that the communication terminal can be assigned to a subnetwork on the basis of a plurality of identifiers, for example an IMSI, an IMEI or an eID of a communication service, a software application or an operating system, which provides a higher degree of flexibility.

Subnetworks can be assigned to different applications or services, with the result that the communication terminal can communicate via a plurality of subnetworks on the further basis thereof. The subnetworks differ from one another by virtue of different functions, services or applications.

The assignment of a communication terminal to a subnetwork can be advantageously quickly found since the management entity can be arranged on the same communication level as the subnetworks, for example on the application layer according to the 5G layer model. Therefore, there is no need to initiate a connection request to superordinate network management which can be arranged, for example, in a superordinate management and instrumentation layer according to the 5G layer model. In one embodiment, a UE or communication terminal can be assigned, on the basis of some information, to a subnetwork which can be identified by means of a subnetwork identifier, with the result that a further assignment of a subnetwork identifier to a subnetwork is not absolutely necessary.

According to one embodiment of the method, the communication terminal transmits the identification of the communication device to the first identification entity or to the second identification entity together with the subnetwork identifier which indicates the subnetwork assigned to the communication terminal. This has the advantage that the communication terminal transmits all necessary information to the respective identification entity in order to identify the communication terminal.

According to one embodiment of the method, the first identification entity transmits the identification of the communication device and the subnetwork identifier to the management entity. This has the advantage that the first identification entity transmits all necessary information to the management entity in order to assign the communication terminal to a subnetwork.

According to one embodiment of the method, in the assigning step, the management entity transmits the subnetwork identifier assigned to the identification of the communication device to the first identification entity, and, if the subnetwork identifier assigned to the identification of the communication terminal and the subnetwork identifier of the first subnetwork are different, the first identification entity transmits the transmitted subnetwork identifier to the communication terminal, or, if the subnetwork identifier assigned to the identification of the communication terminal and the subnetwork identifier of the first subnetwork are different, the first identification entity transmits the transmitted subnetwork identifier to the second identification entity. This has the advantage of a flexible assignment of a communication terminal to a subnetwork. The assignment information must be present only in the management entity and not in each individual subnetwork.

According to one embodiment, the subnetwork identifier is forwarded to the second identification entity only when the UE or communication terminal also receives the subnetwork identifier. The verification via the second identification entity can then be omitted in the second step, which simplifies the method.

According to one embodiment of the method, in the step of establishing the communication connection via the second subnetwork, the communication terminal transmits the identification to the second identification entity. This has the advantage that the identification of the communication terminal is therefore available to the second subnetwork and the latter can therefore identify and authenticate the communication terminal.

According to one embodiment of the method, in the step of establishing the communication connection via the second subnetwork, the second identification entity identifies the communication terminal on the basis of the identification of the communication terminal, and the following steps are carried out after the communication terminal has been identified: assigning a subnetwork to the communication terminal by means of the management entity on the basis of the assignment of a subnetwork identifier to the communication terminal; and establishing a communication connection of the communication terminal via the second subnetwork if the subnetwork identifier assigned to the identification of the communication terminal corresponds to the subnetwork identifier of the second subnetwork; or establishing a communication connection of the communication terminal via a further subnetwork of the communication network or rejecting the communication device if the subnetwork identifier assigned to the identification of the communication terminal and the subnetwork identifier of the second subnetwork are different. This advantageously makes it possible to implement recursive connection establishment, that is to say first a connection attempt via the first subnetwork, then via the second subnetwork until finally via an nth subnetwork.

According to one embodiment of the method, in the step of establishing the respective communication connection, the communication terminal transmits a subnetwork identifier to the first identification entity or to the second identification entity. This has the advantage that the subnetwork identifier and the identification of the communication terminal can be used in all further communication nodes in order to establish an efficient communication connection.

According to one embodiment of the method, the respective identification entity or the management entity assigns a subnetwork of the communication network to the communication device on the basis of the transmitted subnetwork identifier if the transmitted subnetwork identifier indicates a subnetwork of another communication network. This has the advantage that roaming can therefore be efficiently implemented by the respective identification entity or the management entity.

According to one embodiment of the method, the respective identification entity or the management entity assigns that subnetwork of the communication network which corresponds to the subnetwork of the other communication network to the communication device. This has the advantage that the method can be used both in the home communication network and in the foreign communication network. Roaming is therefore efficiently implemented.

According to one embodiment of the method, the communication connection is established via the first subnetwork by means of the first identification entity, and the communication connection is established via the second subnetwork by means of the second identification entity. This has the advantage that each subnetwork can independently establish a communication connection to the communication terminal.

According to embodiments of the invention, communication terminals are provided for communicating via a communication network, wherein the communication network has a plurality of subnetworks having a first subnetwork and a second subnetwork, wherein a first identification entity is arranged in the first subnetwork and a second identification entity is arranged in the second subnetwork for the purpose of identifying the communication device, wherein a subnetwork identifier is assigned to each subnetwork of the communication network, wherein a management entity is arranged in the communication network and manages an assignment of the communication terminal to one of the two subnetworks, and wherein the communication terminal comprises the following features: a communication interface for emitting an identification of the communication terminal to the first identification entity of the first subnetwork in order to initiate connection establishment via the first subnetwork, wherein the communication interface is configured to receive, via the first subnetwork, a subnetwork identifier which is assigned to a second subnetwork, and wherein the communication interface is also configured to establish a communication connection via the second subnetwork in response to the reception of the subnetwork identifier.

The performance of communicating with the communication terminal can be increased on account of the subnetwork structure of the communication network. In particular, a higher data throughput, a shorter delay, particularly high reliability, a far higher connection density and a larger mobility area can be obtained thereby. Furthermore, the communication terminal can also be used in highly heterogeneous environments and provides its user with confidentiality, identity and privacy.

In the following detailed description, reference is made to the accompanying drawings which form a part thereof and which show, as an illustration, specific embodiments in which the invention can be carried out. It goes without saying that other embodiments can also be used and structural or logical changes can be made without departing from the concept of the present invention. The following detailed description should therefore not be understood in a restrictive sense. It also goes without saying that the features of the various exemplary embodiments described herein can be combined with one another unless specifically stated otherwise.

The aspects and embodiments are described with reference to the drawings, wherein identical reference signs generally relate to identical elements. Numerous specific details are stated in the following description for the purposes of explanation in order to provide an in-depth understanding of one or more aspects of the invention. However, it may be obvious to a person skilled in the art that one or more aspects or embodiments can be implemented with a lower degree of the specific details. In other cases, known structures and elements are illustrated in a schematic form in order to facilitate the description of one or more aspects or embodiments. It goes without saying that other embodiments can be used and structural or logical changes can be made without departing from the concept of the present invention.

Even though a particular feature or a particular aspect of an embodiment may have been disclosed with respect to only one of a plurality of implementations, such a feature or such an aspect can also be combined with one or more other features or aspects of the other implementations, as may be desirable and advantageous for a given or particular application. Furthermore, to the extent to which the expressions "contain", "have", "having" or other variants thereof are used either in the detailed description or in the claims, such expressions are intended to be inclusive in a manner similar to the expression "comprise". The expressions "coupled" and "connected" may have been used together with derivatives thereof. It goes without saying that such expressions are used to state that two elements cooperate or interact with one another irrespective of whether they are in direct physical or electrical contact or are not in direct contact with one another. In addition, the expression "by way of example" should be interpreted only as an example instead of denoting the best or optimum case. The following description should therefore not be understood in a restrictive sense.

Figure 3:
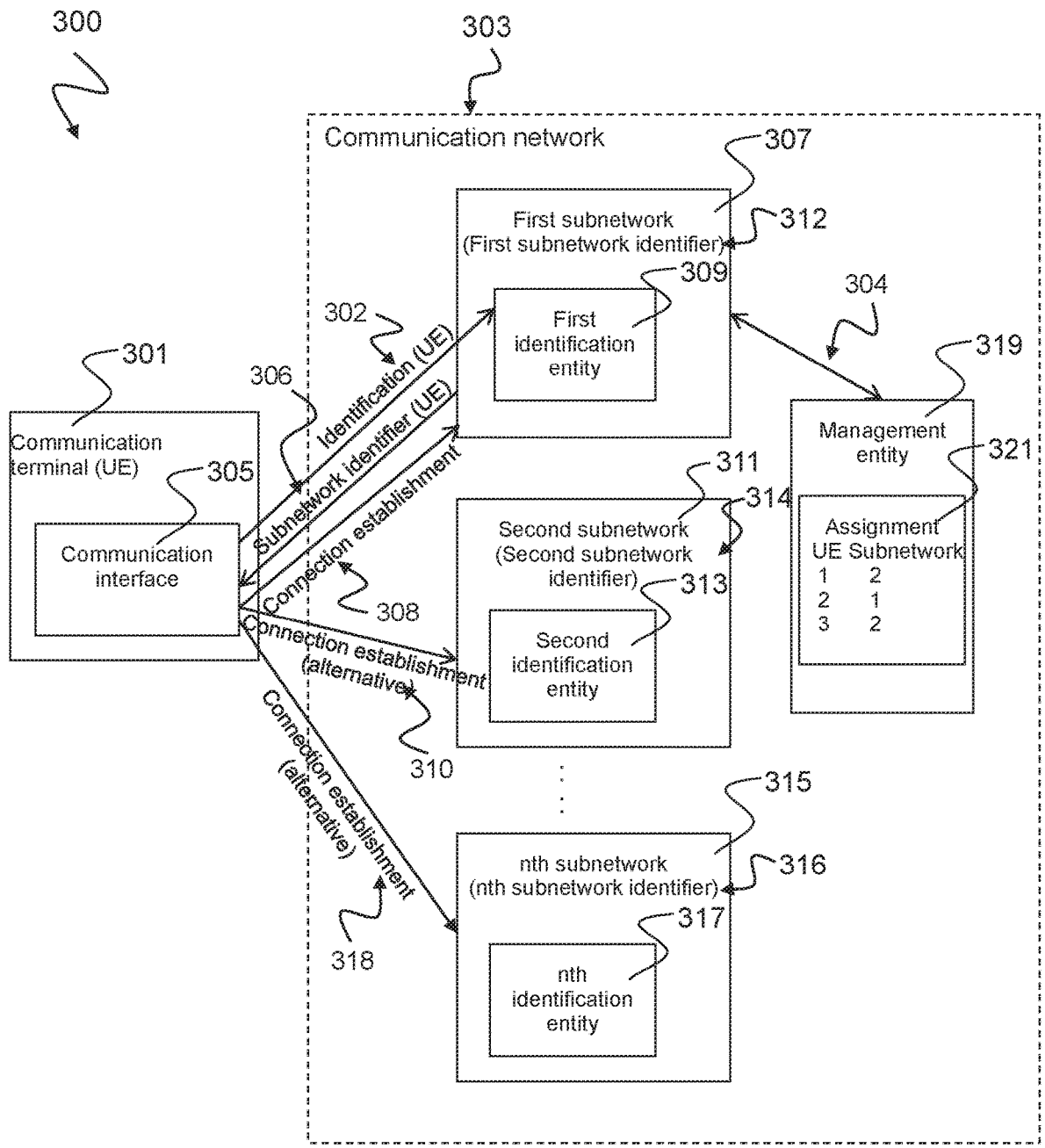
FIG. 3 shows a schematic illustration of a communication system 300 having a communication terminal 301 and a communication network 303 according to an embodiment.

FIG. 3 shows a schematic illustration of a communication system 300 having a communication terminal 301 and a communication network 303 according to one exemplary embodiment.

The communication terminal 301 comprises a communication interface 305 in order to interchange messages with the communication network 303 and to establish a connection of the communication terminal 301 to or via the communication network 303.

The communication network 303 comprises a plurality of subnetworks 307, 311, 315 having a first subnetwork 307, a second network 311 and further subnetworks, of which an nth subnetwork 315 is illustrated by way of example. This plurality of subnetworks corresponds to a plurality of slices 210b, 211b, 212b, as described above with respect to FIG. 1 and FIG. 2. A first identification entity 309 which can be used to identify the communication device 301 is arranged in the first subnetwork 307. A second identification entity 313 which can be used to identify the communication device 301 is arranged in the second subnetwork 311. The same applies to the further subnetworks, that is to say an nth identification entity 317 which can be used to identify the communication device 301 is arranged in the nth subnetwork 315.

Each subnetwork 307, 311, 315 of the communication network 303 is assigned a subnetwork identifier 312, 314, 316 which identifies the corresponding subnetwork. The communication network 303 also comprises a management entity 319 which manages an assignment 321 of the communication terminal 301 to one of the subnetworks 307, 311, 315.

The communication interface 305 of the communication terminal 301 is designed to emit an identification 302 of the communication terminal 301 to the first identification entity 309 of the first subnetwork 307 in order to initiate connection establishment 308 via the first subnetwork 307.

The communication interface 305 is also designed to receive, via the first subnetwork 307, a subnetwork identifier 306 which can be assigned to the second subnetwork 311, for example, and can be stored in the assignment 321 managed by the management entity, for example a table in the management entity.

The communication interface 305 is also designed to establish a communication connection 310 via the second subnetwork 311 in response to the reception of the subnetwork identifier 306, that is to say when assigning the subnetwork identifier 306 to the second subnetwork 311. If the subnetwork identifier 306 is assigned to another subnetwork, for example the nth subnetwork 315, the communication interface 305 will establish a communication connection 318 via the nth subnetwork 315.

With respect to the communication network 303, communication is established as described below.

The first identification entity 309 of the first subnetwork 307, which is assigned, for example as a default subnetwork with a default identification entity, to the communication terminal 301, receives an identification 302 of the communication terminal 301. This identification 302 identifies the communication terminal 301. The first identification entity 309 identifies the communication terminal 301 on the basis of this identification 302. In this case, the tasks of this first identification entity 309 can correspond to or comprise those of an MME (Mobility Management Entity) in the LTE network. The identification can be carried out on the basis of an IMSI or a temporary identification feature of the communication terminal 301, for example a UE, linked thereto.

A subnetwork is then assigned by the management entity 319 on the basis of the assignment 321 of a subnetwork identifier 306 to the communication terminal 301.

This is followed by the establishment of a communication connection 308 of the communication terminal 301 via the first subnetwork 307 if the subnetwork identifier 306 assigned to the identification 302 of the communication terminal 301 corresponds to the subnetwork identifier 312 of the first subnetwork 307. Alternatively, the establishment of a communication connection 310 of the communication terminal 301 via the second subnetwork 311 or via another of the subnetworks, for example a communication connection 318 via the nth subnetwork 315, follows if the subnetwork identifier 306 assigned to the transmitted identification 302 and the subnetwork identifier 312 of the first subnetwork 307 are different or if the subnetwork identifier 306 assigned to the transmitted identification 302 corresponds to the subnetwork identifier 312 of the second subnetwork 311 or of the nth subnetwork 315.

In this case, the tasks of the management entity 319 may correspond to or comprise those of an HSS (Home Subscriber Server) in the LTE (Long Term Evolution) network, that is to say the following procedure for establishing a connection can take place in the communication network 303.

The management entity 319 first of all creates parameters which are required for authentication and subsequently for security-relevant processes such as encryption and protection of the integrity of the messages. These parameters may be a random value RAND, a key $K_{ASME}$, the expected result of the authentication check XRES and the authentication token AUTN. These four parameters can be sent from the management entity 319 to the corresponding subnetwork 307 as a so-called authentication vector.

RAND and AUTN may be transmitted from the first identification entity 309, for example via a first communication node (not illustrated), for example an eNodeB (base station), to the communication terminal 301, for example a UE (User Equipment). The first communication node may be arranged in this case between the communication terminal 301 and the first subnetwork 307 in order to enable communication between the communication terminal 301 and the first identification entity 309. The first communication node can also be connected to further subnetworks 311, 315 in order to enable communication between the communication terminal 301 and further subnetworks 311, 315. The first communication node can be reached by the communication terminal 301, for example using RAT (Radio Access Technology), for example WLAN, WiFi, mobile radio air interface, etc.

The communication terminal 301 can likewise derive some parameters, for example the $K_{ASME}$, from a secret key stored on the UICC, which parameters allow the communication terminal to check the authenticity of the communication network 303 with the aid of the AUTN and to calculate the value RES from RAND and $K_{ASME}$ using a particular algorithm. This value can then be sent to the first identification entity 309, for example via the first communication node. If RES and XRES are the same, the first identification entity 309 sends a message to the management entity 319 in order to inform the latter that the authentication of the communication terminal 301 has been positively concluded. The management entity can then send a list for this communication terminal 301 with permitted connections (PDN Subscription Contexts with QoS profiles) to the first identification entity 309.

The first identification entity 309 can then establish a default carrier (for example an IP connection) from the communication terminal 301, for example via a Serving Gateway (S-GW), to a Packet Data Network Gateway (PDN-GW) and can inform the communication terminal 301 of the successful registration process.

The communication terminal 301 can now communicate via the communication network 303. Further connection requests from the PDN-GW or the communication terminal 301 for additional carriers or modifications of the existing carriers can be authorized by the first identification entity 309 on the basis of the data received from the management entity 319.

The communication connection 310 can be established via the second subnetwork 311 if the subnetwork identifier 306 assigned to the transmitted identification 302 is the subnetwork identifier 314 of the second subnetwork 311.

Alternatively, the communication connection 310 can be established via the nth subnetwork 315 if the subnetwork identifier 306 assigned to the transmitted identification 302 is the subnetwork identifier 316 of the nth subnetwork 315.

The communication network 303 may be a network of a fifth generation (5G) or of a further generation, and the subnetworks 307, 311, 315 may be slices of the communication network 303, as described above with respect to FIGS. 1 and 2.

The management entity 319 can assign 321 the subnetwork identifier 306 to the communication terminal 301 on the basis of one or more of the following assignments: an assignment of the identification 302 of the communication terminal 301, for example a hardware identifier of the communication device 301 such as an IMSI or an IMEI or an eID, to the subnetwork identifier 306 and/or an assignment of a communication service to the communication terminal 301 and/or an assignment of a software application to the communication terminal 301 and/or an assignment of an operating system of the communication terminal 301 to one of the two subnetworks 307, 311.

Subnetworks may be assigned to different applications or services, with the result that the communication terminal 301 can communicate via a plurality of subnetworks 307, 311, 315 on the further basis thereof. The subnetworks may differ from one another by virtue of different functions, services or applications.

In addition to assigning (a) communication terminal(s) 301 to a subnetwork identifier, the management entity 319 may also comprise an assignment of subnetwork identifiers 312, 314, 316 to subnetworks 307, 311, 315, which may be stored in a table or a memory of the management entity 319, for example.

The communication terminal 301 can transmit the identification 302 of the communication device 301, together with the subnetwork identifier 306 which indicates the subnetwork 307, 311, 315 assigned to the communication terminal 301, to the first identification entity 309 or to the other identification entities 313, 317. In response, the first identification entity 309 can transmit the identification 302 of the communication device 301 and the subnetwork identifier 312 of the first subnetwork 307 to the management entity 319. The same functionality also applies to the other identification entities 313, 317.

When assigning a subnetwork to the communication terminal 301, the management entity 319 can transmit the subnetwork identifier 306 assigned to the identification 302 of the communication device 301 to the first identification entity 309. If the subnetwork identifier 306 assigned to the identification 302 of the communication terminal 301 and the subnetwork identifier 312 of the first subnetwork 307 are different, the first identification entity 309 can transmit the transmitted subnetwork identifier 306 to the communication terminal 301. If the subnetwork identifier 306 assigned to the identification 302 of the communication terminal 301 and the subnetwork identifier 312 or the first subnetwork 307 are different, the first identification entity 309 can transmit the transmitted subnetwork identifier 306 to the second identification entity 313.

When establishing the communication connection 310 via the second subnetwork 311, the communication terminal 301 can transmit the identification 302 to the second identification entity 313.

When establishing the communication connection 310 via the second subnetwork 311, the second identification entity 313 can identify the communication terminal 301 on the basis of the identification 302 of the communication terminal 301. The following steps can be carried out after the communication terminal 301 has been identified: assigning a subnetwork 307, 311, 315 to the communication terminal 301 by means of the management entity 319 on the basis of the assignment 321 of a subnetwork identifier to the communication terminal 301; and establishing a communication connection 310 of the communication terminal via the second subnetwork 311 if the subnetwork identifier 306 assigned to the identification 302 of the communication terminal 301 corresponds to the subnetwork identifier 314 of the second subnetwork 311. Alternatively, a communication connection 318 of the communication terminal 301 can be established via a further subnetwork 315 of the communication network 303 or the communication device 301 can be rejected if the subnetwork identifier 306 assigned to the identification 302 of the communication terminal 301 and the subnetwork identifier 314 of the second subnetwork 311 are different.

The connection can be established recursively here. That is to say, an attempt is first of all made to establish communication via the first subnetwork 307. If this is not possible on account of an unsuitable subnetwork identifier 306 of the communication terminal 301, an attempt is made to establish communication via the second subnetwork 311. If this is also not possible on account of an unsuitable subnetwork identifier 306 of the communication terminal 301, an attempt is made to establish communication via a further subnetwork, for example the nth subnetwork 315. If this last communication establishment is not possible on account of an unsuitable subnetwork identifier 306 of the communication terminal 301, communication establishment is rejected. Alternatively, communication establishment can also be rejected even earlier, for example after the first, second, third, nth unsuccessful attempt.

When establishing the respective communication connection 308, 310, 318, the communication terminal 301 can transmit the subnetwork identifier 306 assigned to the transmitted identification 302 to the first identification entity 309 or the second identification entity 313 or the nth identification entity 317.

The respective identification entity 309, 313, 317 or the management entity 319 can assign a subnetwork 307, 311, 315 of the communication network 303 to the communication device 301 on the basis of the transmitted subnetwork identifier 306 if the transmitted subnetwork identifier 306 indicates a subnetwork of another communication network, for example a foreign network. Roaming can be carried out here via the respective identification entities 309, 313, 317; the function is described from the point of view of the network visited. In this case, the respective identification entity 309, 313 or the management entity 319 can assign that subnetwork 307, 311, 315 of the communication network 303 which corresponds to the subnetwork of the other communication network to the communication device 301. The subnetworks in different communication networks may have different identifiers. When accordingly assigning the subnetwork in the communication network 303 to the communication terminal 301 which corresponds to the corresponding subnetwork in the home network, that is to say that subnetwork in the home network which provides the same services, for example, roaming can be facilitated in foreign networks. This assignment can be effected, for example, via look-up tables which can be stored in the respective identification entity 309, 313, 317 or the management entity 319. In one embodiment, the communication device can roam in the communication network 303 and has, in its home network or in another communication network, an assignment to a slice which is simulated here in the communication network 303.

The communication connection 308 via the first subnetwork 307 can be established by means of the first identification entity 309; the communication connection 310 via the second subnetwork 311 can be established by means of the second identification entity 313. The communication connection 318 via the nth subnetwork 315 can be established by means of the nth identification entity 317. Alternatively, these communication connections 308, 310, 318 can also be established with the aid of the communication terminal 301.

Figure 4:
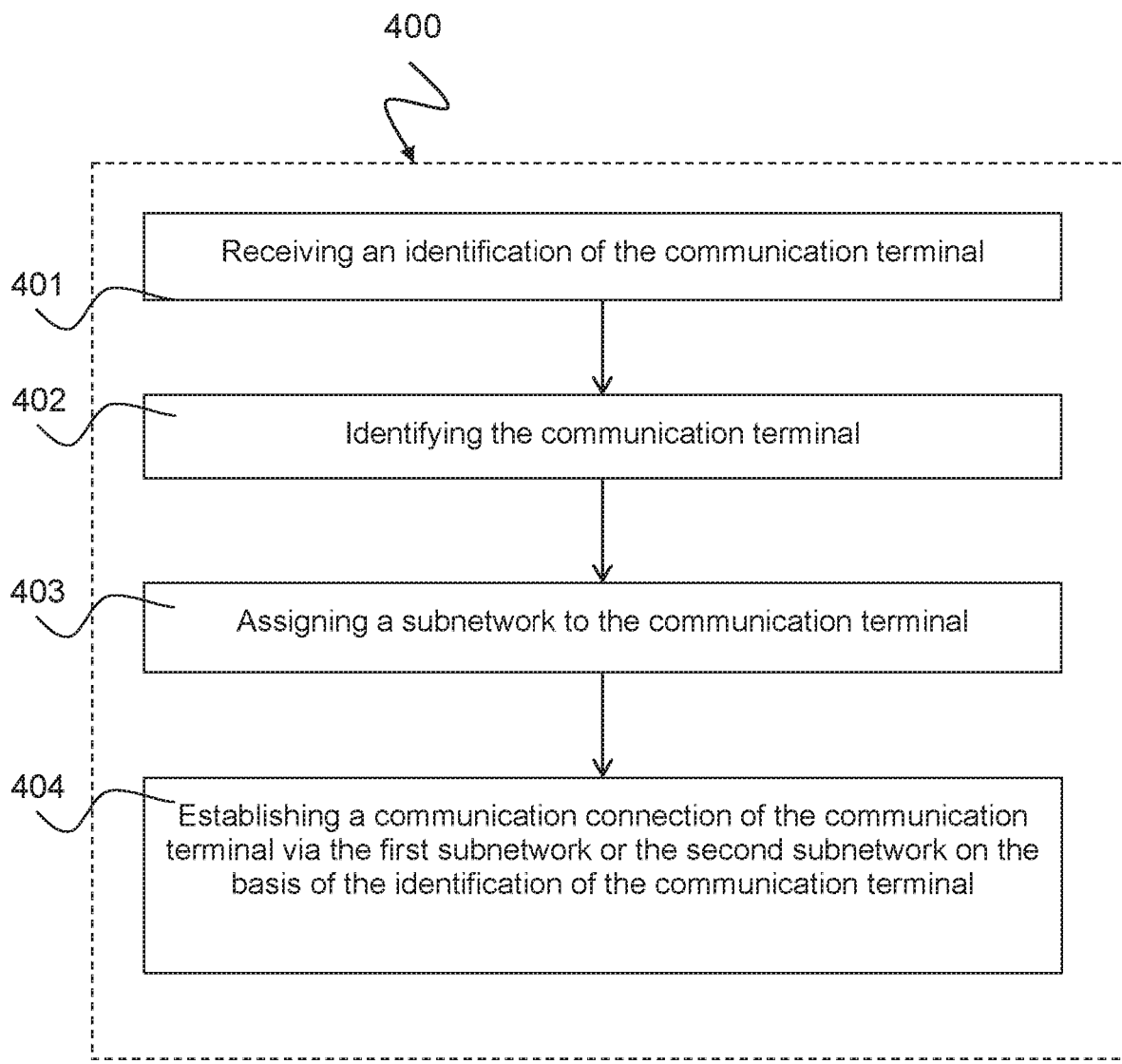
FIG. 4 shows a schematic illustration of a method 400 for establishing a communication connection of a communication terminal via a communication network according to an embodiment.

FIG. 4 shows a schematic illustration of a method 400 for establishing a communication connection of a communication terminal via a communication network according to one exemplary embodiment.

The communication network can correspond to the communication network 303 described above with respect to FIG. 3. That is to say, the communication network 303 comprises a plurality of subnetworks 307, 311, 315 having a first subnetwork 307, a second subnetwork 311 and an nth subnetwork 315. A first identification entity 309 for identifying the communication device 301 is arranged in the first subnetwork 307, a second identification entity 313 for identifying the communication device 301 is arranged in the second subnetwork 311 and an nth identification entity 317 for identifying the communication device 301 is arranged in the nth subnetwork 315. A subnetwork identifier is assigned to each subnetwork 307, 311, 315 of the communication network 303. A management entity 319 is arranged in the communication network 303 and manages an assignment 321 of the communication terminal 301 to one of the subnetworks 307, 311, 315.

The method 400 comprises receiving 401 an identification 302 of the communication terminal 301 by means of the first identification entity 309 of the first subnetwork 307, wherein the identification 302 identifies the communication terminal 301, for example according to the description with respect to FIG. 3.

The method 400 also comprises identifying 402 the communication terminal 301 by means of the first identification entity 309 on the basis of the identification 302 of the communication terminal 301.

The method 400 also comprises assigning 403 a subnetwork to the communication terminal 301 by means of the management entity 319 on the basis of an assignment 321 of a subnetwork identifier 306 to the communication terminal 301.

The method 400 also comprises establishing 404 a communication connection 308 of the communication terminal 301 via the first subnetwork 307 if the subnetwork identifier 306 assigned to the identification 302 of the communication terminal 301 corresponds to the subnetwork identifier 312 of the first subnetwork 307; or establishing a communication connection 310 of the communication terminal 301 via the second subnetwork 311 if the subnetwork identifier 306 assigned to the transmitted identification 302 and the subnetwork identifier 312 of the first subnetwork 307 are different.

The communication connection 310 can be established via the second subnetwork 315 if the subnetwork identifier 306 assigned to the transmitted identification 302 is the subnetwork identifier 314 of the second subnetwork.

The communication network 303 may be a network of a fifth generation (5G) or of a further generation, and the subnetworks 307, 311, 315 may be slices of the communication network 303, as described above with respect to FIGS. 1 and 2.

The management entity 319 can assign 321 the subnetwork identifier 306 to the communication terminal 301 on the basis of at least one of the following assignments: an assignment of the identification 302 of the communication terminal 301, in particular a hardware identifier of the communication device 301 such as an IMSI or an IMEI or an eID, to the subnetwork identifier 306 and/or an assignment of a communication service to the communication terminal 301 and/or an assignment of a software application to the communication terminal 301 and/or an assignment of an operating system of the communication terminal 301 to one of the two subnetworks 307, 311, for example according to the description with respect to FIG. 3.

The communication terminal 301 can transmit the identification 302 of the communication device 301 to the first identification entity 309, to the second identification entity 313 or to the nth identification entity 317 together with the subnetwork identifier 306 which indicates the subnetwork 307, 311, 315 assigned to the communication terminal 301, for example as described above with respect to FIG. 3.

The first identification entity 309 can transmit the identification 302 of the communication device 301 and the subnetwork identifier 312 of the first subnetwork 307 to the management entity 319, for example as described above with respect to FIG. 3.

In the assigning step 403, the management entity 319 can transmit the subnetwork identifier 306 assigned to the identification 302 of the communication device 301 to the first identification entity 309. If the subnetwork identifier 306 assigned to the identification 302 of the communication terminal 301 and the subnetwork identifier 312 of the first subnetwork 307 are different, the first identification entity 309 can transmit the transmitted subnetwork identifier 306 to the communication terminal 301. Alternatively, if the subnetwork identifier 306 assigned to the identification 302 of the communication terminal 301 and the subnetwork identifier 312 of the first subnetwork 307 are different, the first identification entity 309 can transmit the transmitted subnetwork identifier 306 to the second identification entity 313, for example as described above with respect to FIG. 3.

In the step of establishing 404 the communication connection 310 via the second subnetwork 311, the communication terminal 301 can transmit the identification 302 to the second identification entity 313, for example as described above with respect to FIG. 3.

In the step of establishing 404 the communication connection 310 via the second subnetwork 311, the second identification entity 313 can identify the communication terminal 301 on the basis of the identification 302 of the communication terminal 301, for example as described above with respect to FIG. 3.

After the communication terminal 301 has been identified, the following further steps can be carried out: assigning a subnetwork 307, 311, 315 to the communication terminal 301 by means of the management entity on the basis of the assignment 321 of a subnetwork identifier to the communication terminal 301; and establishing a communication connection 310 of the communication terminal via the second subnetwork 311 if the subnetwork identifier 306 assigned to the identification 302 of the communication terminal 301 corresponds to the subnetwork identifier 314 of the second subnetwork 311; or establishing a communication connection 318 of the communication terminal 301 via a further subnetwork 315 of the communication network 303 or rejecting the communication device 301 if the subnetwork identifier 306 assigned to the identification 302 of the communication terminal 301 and the subnetwork identifier 314 of the second subnetwork 311 are different, for example as described above with respect to FIG. 3.

In the step of establishing 404 the respective communication connection 308, 310, 318, the communication terminal 301 can transmit the subnetwork identifier 306 assigned to the transmitted identification 302 to the first identification entity 309, the second identification entity 313 or the nth identification entity 317, for example as described above with respect to FIG. 3.

The respective identification entity 309, 313, 317 or the management entity 319 can assign a subnetwork 307, 311, 315 of the communication network 303 to the communication device 301 on the basis of the transmitted subnetwork identifier 306 if the transmitted subnetwork identifier 306 indicates a subnetwork of another communication network, for example as described above with respect to FIG. 3.

The respective identification entity 309, 313, 317 or the management entity 319 can assign that subnetwork 307, 311, 315 of the communication network 303 which corresponds to the subnetwork of the other communication network to the communication device 301, for example as described above with respect to FIG. 3.

The communication connection 308 can be established via the first subnetwork 307 by means of the first identification entity 309 and the communication connection 310 via the second subnetwork 311 can be established by means of the second identification entity 313, for example as described above with respect to FIG. 3.

Figure 5:
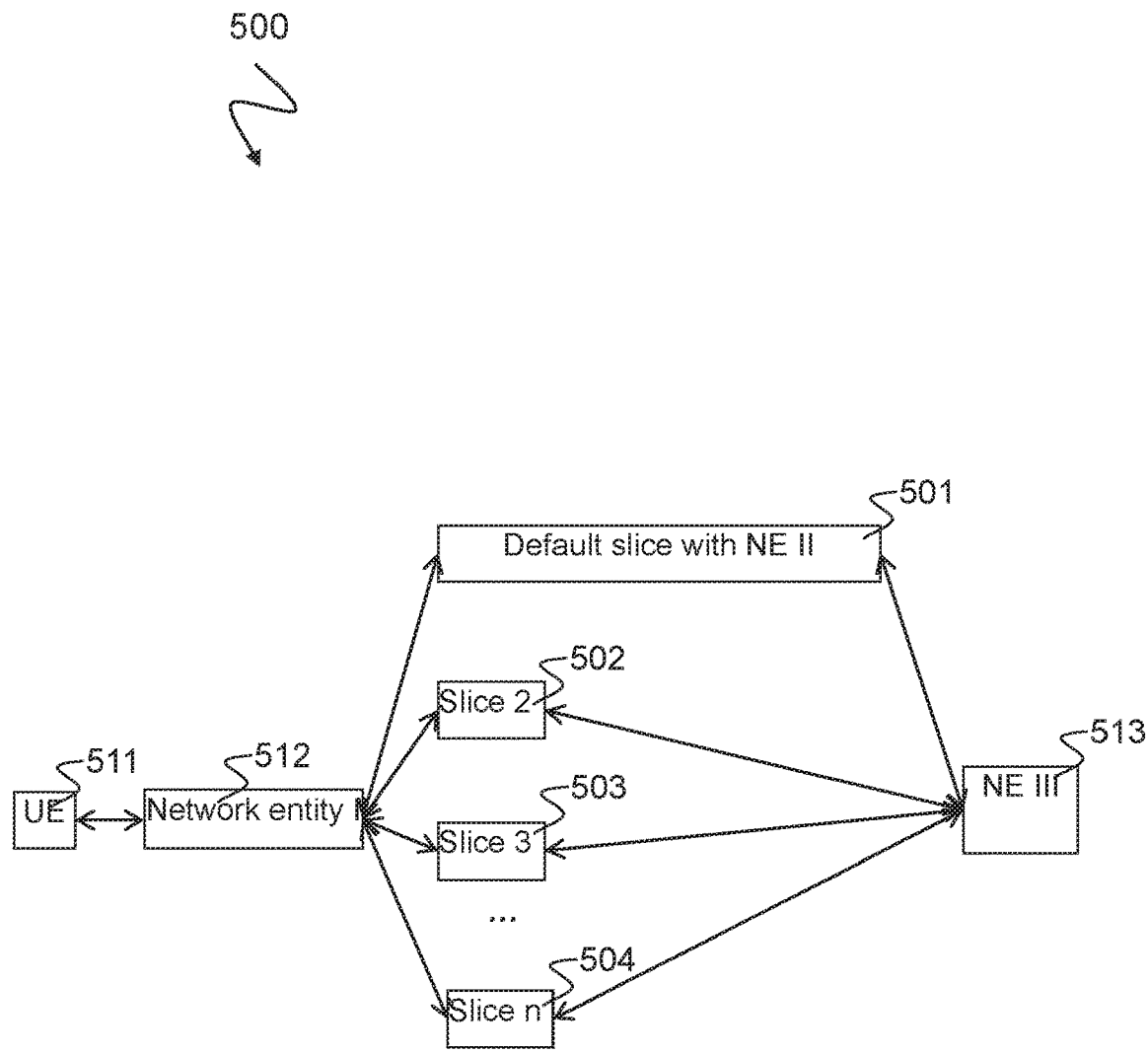
FIG. 5 shows a schematic illustration of the process of registering a communication terminal in a communication network using the example of a 5G network 500 according to an embodiment.

FIG. 5 shows a schematic illustration of the process of registering a communication terminal in a communication network using the example of a 5G network 500 according to one exemplary embodiment. The 5G network 500 comprises a UE 511, first network entity 512, a plurality of slices 501, 502, 503, 504, each of which is assigned a second network entity, and a third network entity 513. The UE (User Equipment) is an example of a communication terminal 301 as described above with respect to FIGS. 3 and 4. The first network entity 512 can correspond to the first communication node described above with respect to FIG. 3. It may be, for example, an eNodeB or a base station. The slices 501, 502, 503, 504 may correspond to the subnetworks 307, 311, 315 described above with respect to FIGS. 3 and 4 or to the network slices 210b, 211b, 212b or entities 210a, 211a, 212a of these network slices described with respect to FIG. 2. The first slice 501 is described here as a default slice, by way of example. Any other of the slices 502, 503, 504 can naturally also be specified as a default slice. The third network entity 513 may correspond to the network entity 319 described above with respect to FIGS. 3 and 4. It may be arranged, for example, in the management and instrumentation level 106 described in FIG. 1. The third network entity 513 may also perform, inter alia, the tasks of an HSS according to LTE terminology. The respective second network entities assigned to the slices 501, 502, 503, 504 may also perform, inter alia, the tasks of an MME according to LTE terminology.

In one embodiment, the structure of the 5G network 500 is similar to the structure of an LTE network. However, the home network has a plurality of subnetworks 501, 502, 503, 504 which are referred to as slices. The UE is therefore assigned not only to the home network (via the third network entity 513, comparable to the HSS) but also to the respective slice. In analogy to an MME according to LTE terminology, the second network entities can simultaneously be part of the default slice 501, which is dependent on the exact function. The subnetworks 501, 502, 503, 504 can then each have a connection to the third network entity 513 in analogy to the HSS according to LTE, as illustrated here in FIG. 5.

An exemplary process of registering in the 5G network 500 is described below.

The UE 511 connects to the second network entity of the default slice 501 via the first network entity 512. The second network entity of the default slice 501 identifies the UE 511 on the basis of the IMSI or a temporary identification feature linked thereto and passes the request from the UE 511 to register in the network to the third network entity 513.

The third network entity 513 first of all creates parameters which are required for authentication and subsequently for security-relevant processes such as encryption and protection of the integrity of the messages. These parameters are a random value RAND, a key $K_{ASME}$, the expected result of the authentication check XRES and the authentication token AUTN. These four parameters are sent from the third network entity 513 to the second network entity of the default slice 501 as a so-called authentication vector. RAND and AUTN are transmitted from the second network entity of the default slice 501 to the UE 511 via the first network entity 512. The UE 511 can likewise derive some parameters, for example the $K_{ASME}$, from a secret key stored on the UICC, which parameters allow the UE to check the authenticity of the network with the aid of the AUTN and to calculate the value RES from RAND and $K_{ASME}$ using a particular algorithm. This value is sent to the second network entity of the default slice 501 via the first network entity 512. If RES and XRES are the same, the second network entity of the default slice 501 sends a message to the third network entity 513 in order to inform the latter that the authentication of the UE 511 has been positively concluded. The third network entity 513 then sends a list of connections permitted for this UE 511, for example PDN (Packet Data Network) Subscription Contexts with QoS (Quality of Service) profiles, to the second network entity of the default slice 501.

The second network entity of the default slice 501 then establishes a default bearer or carrier (for example an IP connection) from the UE 511 to a PDN-GW, for example, via an S-GW, for example, and informs the UE 511 of the successful registration process. The UE 511 can now communicate via the communication network. Further connection requests from the PDN-GW or the UE 511 for additional bearers or modifications of the existing bearers can be authorized by the second network entity of the default slice 501 on the basis of the data received from the third network entity 513.

All subnetworks (slices) 501, 502, 503, 504 are predefined both with regard to the subnetwork structure (that is to say which functionalities are present, which network topology is defined) and with regard to the functionality.

The network entities II (on default slice 501) and III 513 are assigned to the control plane. The network entity I 512 is assigned to both the control plane and the user plane; for example, the signaling between the network entity I 512 and the network entity II (on default slice 501) can take place on the control plane (CP), whereas the user data can run between the network entity I 512 and the S-GW and PDN-GW on the user plane (UP). The subnetworks 501, 502, 503, 504 logically converge in the network entity III 513. There are a plurality of possibilities for the network entity II: if the range of functions is similar to the MME according to LTE terminology, the network entity II is part of the default slice 501, as illustrated in FIG. 5. In any case, there is the following two-stage process:

a) The UE 511 attempts to register itself, is fully authenticated by the network entities II and III 513, as described above, and is either allocated to another slice or is left in the default slice 501. This default slice 501 may be a standard multimedia broadband network in one configuration.

b) If the UE 511 is allocated to another slice, the network entity I 512 repeats the registration process in the direction of the allocated slice (and the network entity II therein) and, if successful, the UE 511 is deregistered from the default slice 501.

In terms of the sequence, this can correspond, for example, to a tracking area update according to LTE terminology, that is to say the method which is carried out when the UE 511 comes from the area of an MME/S-GW into that of another MME/S-GW, but, in contrast to this (where the eNodeB of a network is connected only to an MME), the network entity I 512 can select another network entity II on the basis of the subnetwork identifier.

In one implementation form, the UE 511 can be authenticated in a) or b) or in a) and b). This can be configured, for instance, in a similar manner to the tracking area update described above.

In one implementation form, the network entity II has only the functionality needed to determine the slice using the network entity III 513. It is then not part of the default slice and a step b) is always carried out.

The network entity III 513 identifies the UE 511 on the basis of the IMSI, for example, and assigns the associated slice, for example subnetwork I 501, to the UE 511. The slice is allocated on the basis of the data stored in the network entity III and possibly with the inclusion of parameters transmitted to the network entity II when registering the UE 511. These may be hardware identifiers (for example the IMEI), operating system information or application IDs.

In an alternative variant, the UE 511 transmits the identifier of the corresponding subnetwork in the second step b). This is the identifier which it has received from the network entity III via the network entity II in the first step a). The UE 511 then repeats the registration process in the direction of the allocated slice in step b). That is to say, in this alternative, the slices converge in the UE 511, and not in the network entity I 512.

In this alternative variant, instead of its own ID (for example IMSI), the UE 511 can then give its own ID with the slice ID during each connection establishment. The correct network entity II can therefore always be selected and the network entity I 512 need not store any status with regard to the UE 511 and the UE 511 may also be part of a plurality of slices. This also simplifies the procedures when changing the network entity I 512.

In another alternative variant, the UE 511 transmits the identifier of the subnetwork from the outset. The subnetwork can contain, for example, an S-GW (analog), a PDN-GW (analog) etc. These network entities are parameterized for the UE 511. This is carried out via the network entity II when necessary—if, for example, a new bearer is established.

After the slice has been allocated and registration in the latter has been carried out, the network entity II which served as a first contact point for the registration is no longer incorporated in the signaling flow (apart from the fact that the UE 511 remains in the default slice 501 and the network entity II is part of the default slice 501).

After the parameterization, the UE 511 can communicate via the subnetwork I 501, for example in the Internet, or can register in the IMS and can use telecommunications services (for example telephony).

The subnetworks I to n 501, 502, 503, 504 are decoupled from one another.

The above concept similarly applies to the registration in a foreign network. Here, the network entity III similarly selects the subnetwork and the parameters. In the foreign network, the network entity II in the network visited will select that predefined subnetwork of the foreign network which corresponds to the home subnetwork (for example using a look-up table).

One aspect of the invention also comprises a computer program product which can be directly loaded into the internal memory of a digital computer and comprises software code sections which can be used to carry out the method 400 described with respect to FIG. 4 or the processes described with respect to FIGS. 3 and 5 when the product runs on a computer. The computer program product can be stored on a non-transitory medium suitable for a computer and can comprise computer-readable program means which cause a computer to carry out the method 400 or to implement or control the network components of the communication networks described in FIGS. 1 to 5.

The computer may be a PC, for example a PC of a computer network. The computer may be implemented as a chip, an ASIC, a microprocessor or a signal processor and may be arranged in a computer network, for example in a communication network as described in FIGS. 1 to 5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

It goes without saying that the features of the various embodiments described by way of example herein can be combined with one another unless specifically stated otherwise. As described in the description and the drawings, individual elements which have been illustrated as being connected need not be directly connected to one another; intermediate elements may be provided between the connected elements. It also goes without saying that embodiments of the invention can be implemented in individual circuits, partially integrated circuits or fully integrated circuits or programming means. The term "for example" is only meant as an example and not as the best or optimum case. Particular embodiments have been illustrated and described herein, but it is obvious to a person skilled in the art that a multiplicity of alternative and/or identical implementations can be implemented instead of the embodiments shown and described without departing from the concept of the present invention.

LIST OF REFERENCE NUMERALS

- 100: 5G system architecture
- 101: Access device, communication terminal, UE
- 102: Access technology
- 103: Application layer
- 104: Activation layer
- 105: Infrastructure and resource layer
- 106: Management and instrumentation layer
- 200: 5G communication network having a plurality of slices
- 210a: First slice entity
- 210b: First network slice
- 211a: Second slice entity
- 211b: Second network slice
- 212a: Third slice entity
- 212b: Third network slice
- 213: Slice composition
- 221: Abstracted objects
- 222: Virtual network functions
- 223: Combined objects
- 224: Aggregated objects
- 225: Object library
- 231: Access node
- 232: Access node
- 233: Access node
- 234: Virtual network node
- 235: Virtual network node
- 236: Virtual network node
- 237: Virtual network node
- 238: Computer node
- 239: Computer node
- 240: Computer node
- 251: Infrastructure services
- 300: Communication system
- 301: Communication terminal, for example UE
- 302: Identification of the communication terminal
- 303: Communication network
- 304: Connection between the first subnetwork and the management entity
- 305: Communication interface
- 306: Subnetwork identifier of the communication terminal
- 307: First subnetwork
- 308: Connection establishment via the first subnetwork
- 309: First identification entity
- 310: Connection establishment via the second subnetwork
- 311: Second subnetwork
- 312: First subnetwork identifier
- 313: Second identification entity
- 314: Second subnetwork identifier
- 315: nth subnetwork
- 316: nth subnetwork identifier
- 317: nth identification entity
- 318: Connection establishment via the nth subnetwork
- 319: Management entity
- 321: Assignment of the communication terminal to the subnetwork identifier
- 400: Method for establishing a communication connection
- 401: First step: receiving
- 402: Second step: identifying
- 403: Third step: assigning
- 404: Fourth step: establishing
- 500: 5G communication network
- 501: Default slice with network entity II or second network entity
- 502: Slice 2
- 503: Slice 3
- 504: Slice n
- 511: UE or communication terminal
- 512: First network entity or network entity I
- 513: Third network entity or network entity III

KEY TO FIGURES

- 101=Access device
- 102=Access technology
- 103=Application layer
- 104=Activation layer
- 105=Infrastructure and resource layer
- 106=Management and instrumentation
- 210a, 211a, 212a=Slice entity
- 210b, 211b, 212b=Network slice
- A=Platform services
- B=Infrastructure services
- 303=Communication network
- 301=Communication terminal (UE)
- 305=Communication interface
- 302=Identification (UE)
- 306=Subnetwork identifier (UE)
- 308=Connection establishment
- 310, 318=Connection establishment (alternative)
- 307=First subnetwork
- 312=(First subnetwork identifier)
- 309=First identification entity
- 311=Second subnetwork
- 314=(Second subnetwork identifier)
- 313=Second identification entity
- 315=nth subnetwork
- 316=(nth subnetwork identifier)
- 317=nth identification entity
- 319=Management entity
- 321=Assignment
UE Subnetwork
- 401=Receiving an identification of the communication terminal
- 402=Identifying the communication terminal
- 403=Assigning a subnetwork to the communication terminal
- 404=Establishing a communication connection of the communication terminal via the first subnetwork or the second subnetwork on the basis of the identification of the communication terminal
- 512=Network entity I
- 501=Default slice with NE II

The invention claimed is:

1. A method for establishing a communication connection of a communication terminal via a communication network, wherein the communication network has a plurality of subnetworks including a first subnetwork and a second subnetwork, wherein a first identification entity is arranged in the first subnetwork and a second identification entity is arranged in the second subnetwork for identifying the communication terminal, wherein a respective subnetwork identifier is assigned to each of the first subnetwork and the second subnetwork, and wherein a management entity is arranged in the communication network and is configured to manage an assignment of the communication terminal to the first subnetwork or the second subnetwork, the method comprising:
  receiving, by the first identification entity of the first subnetwork, an identification of the communication terminal, wherein the identification of the communication terminal identifies the communication terminal;
  identifying, by the first identification entity, the communication terminal based on the identification of the communication terminal;
  transmitting, by the first identification entity, the identification of the communication terminal and a first subnetwork identifier of the first subnetwork to the management entity;
  assigning, by the management entity, a subnetwork to the communication terminal based on an assignment of a subnetwork identifier to the communication terminal, wherein the assignment of the subnetwork identifier to the communication terminal is based on at least one of:
    an assignment of a communication service of the communication terminal to the subnetwork, an assignment of a software application of the communication terminal to the subnetwork, or an assignment of an operating system of the communication terminal to the subnetwork; and
  establishing a communication connection of the communication terminal via the assigned subnetwork.

2. The method as claimed in claim 1, wherein the subnetwork identifier assigned to the communication terminal is a second subnetwork identifier of the second subnetwork, and the communication connection is established via the second subnetwork.

3. The method as claimed in claim 1, wherein the communication network is a network of a fifth generation (5G) or of a further generation, and wherein the subnetworks are slices of the communication network.

4. The method as claimed in claim 1, wherein an assignment of subnetwork identifiers to subnetworks is stored in the management entity.

5. The method as claimed in claim 1, wherein the communication terminal transmits the identification of the communication terminal to the first identification entity or to the second identification entity together with the subnetwork identifier.

6. The method as claimed in claim 1, wherein assigning the subnetwork to the communication terminal includes:
  transmitting, by the management entity, the subnetwork identifier assigned to the identification of the communication terminal to the first identification entity; and
  transmitting, by the first identification entity, the subnetwork identifier to the communication terminal or to the second identification entity based on whether the subnetwork identifier is the first subnetwork identifier of the first subnetwork or whether the subnetwork identifier is different from the first subnetwork identifier of the first subnetwork, respectively.

7. The method as claimed in claim 1, wherein the assigned subnetwork is the second subnetwork; and
  wherein establishing the communication connection via the assigned subnetwork includes transmitting, by the communication terminal, the identification to the second identification entity.

8. The method as claimed in claim 7, wherein establishing the communication connection via the assigned subnetwork includes:
  identifying, by the second identification entity, the communication terminal based on the identification of the communication terminal.

9. The method as claimed in claim 1, wherein establishing the communication connection includes:
  transmitting, by the communication terminal, the subnetwork identifier to the first identification entity or to the second identification entity.

10. The method as claimed in claim 1, wherein the communication connection is established via the first subnetwork by the first identification entity, or the communication connection is established via the second subnetwork by the second identification entity.

11. The method as claimed in claim 1, wherein the identification of the communication terminal is a hardware identifier of the communication terminal.

12. A system, comprising:
  a communication terminal; and
  a communication network comprising, a plurality of subnetworks having a first subnetwork and a second subnetwork, wherein a first identification entity is arranged in the first subnetwork and a second identification entity is arranged in the second subnetwork for identifying the communication terminal, wherein a respective subnetwork identifier is assigned to each of the first subnetwork and the second subnetwork of the communication network, wherein a management entity is arranged in the communication network and is configured to manage an assignment of the communication terminal to the first subnetwork or the second network;
  wherein the communication terminal is configured to transmit an identification of the communication terminal to the first identification entity of the first subnetwork;
  wherein the first identification entity of the first subnetwork is configured to:
    receive the identification of the communication terminal, wherein the identification of the communication terminal identifies the communication terminal;
    identify the communication terminal based on the identification of the communication terminal;
    transmit the identification of the communication terminal and a first subnetwork identifier of the first subnetwork to the management entity;
  wherein the management entity is configured to assign a subnetwork to the communication terminal based on an assignment of a subnetwork identifier to the communication terminal, wherein the assignment of the subnetwork identifier to the communication terminal is based on at least one of: an assignment of a communication service of the communication terminal to the subnetwork, an assignment of a software application of the communication terminal to the subnetwork, or an assignment of an operating system of the communication terminal to the subnetwork; and
  wherein the communication interface is configured to receive, via the first subnetwork, the subnetwork identifier of the subnetwork assigned to the communication terminal; and
  wherein the communication terminal is configured to establish a communication connection via the assigned network.

* * * * *